United States Patent [19]
Leblanc

[11] 3,790,259
[45] Feb. 5, 1974

[54] EYE PROTECTION FRAME ASSEMBLY
[75] Inventor: Conrad L. Leblanc, Leominster, Mass.
[73] Assignee: Foster Grant Co., Inc., Leominster, Mass.
[22] Filed: Aug. 14, 1972
[21] Appl. No.: 280,297

[52] U.S. Cl............... 351/113, 16/128 A, 351/121, 351/153
[51] Int. Cl......... G02c 5/16, G02c 5/22, E05d 3/02
[58] Field of Search....... 351/113, 121, 153; 2/14 T, 2/14 UT; 16/128 A

[56] References Cited
UNITED STATES PATENTS
3,531,190  9/1970  Leblanc............................ 351/113
3,671,111  6/1972  Okner................................ 351/113
3,701,591  10/1972  Wichers........................ 351/113 X Primary Examiner—Paul A. Sacher

[57] ABSTRACT

An eye protection frame assembly including means for connecting a pair of temple members to a front lens retaining portion. The temple members are each pivoted to an open position and then further spread apart by applying biasing force against a spring member so that they may slip around the wearers head. The spring members then urge the temples back toward one another resulting in a snug fit on the wearers head.

4 Claims, 8 Drawing Figures

PATENTED FEB 5 1974 3,790,259

EYE PROTECTION FRAME ASSEMBLY

BACKGROUND OF THE INVENTION

This invention relates generally to an eye protection frame assembly including a front lens retaining portion and a pair of temple portions which extend backward in the normal open position to help support the assembly in proper position on the head of the wearer. A particular aim is to provide an assembly which will support the lens which may be a one-piece transparent member, for example, in proper position without slippage, even during participation in an active sport such as skiing or motorcycle or boat racing.

A snug fit of the eye protection frame assembly is thus required so that quick movements of the head will not cause displacement and for this reason, large temple members are employed and the structures utilized to connect the temple portions to the front lens retaining portion cause the temples to hug either side and part of the rear portion of the wearers head. Simple hinges which allow only pivotal movement of the temple portion from their closed position to the open position are not adequate for this purpose and thus the present invention replaces such hinges with special means to provide the required fit. The special means provided also allow for fitting various head sizes and for automatically adjusting each temple portion so that they both fit the wearers head with substantially equal snugness.

OBJECTS AND SUMMARY OF THE INVENTION

An object of the present invention is to provide an eye protection frame assembly which will maintain its position on the head of the wearer under conditions where quick head movements or jarring may be experienced.

Another object of this invention is to provide special temple members and structure connecting the temple members to the front lens retaining portion which provide a snug fit on the side and part of the rear portion of the wearers head.

Still another object is to provide an eye protection frame assembly which will adjust to many different head sizes to fit various wearers while maintaining balanced tension of each temple to provide the required snug fit.

Pursuant to the above objects, the temple members are connected to the front lens retaining assembly by means allowing certain limited pivoting movement of the temple members between an open and closed position. Each of the temple members which are preferably much longer than ordinary spectacle temples require, in addition, outward biasing force against a spring member to allow them to open wide enough to slip around the wearers head and the spring member then urges the temples back toward one another resulting in the aforementioned snug fit about the side and rear portion of the wearers head.

DESCRIPTION OF THE INVENTION

Figure 1:
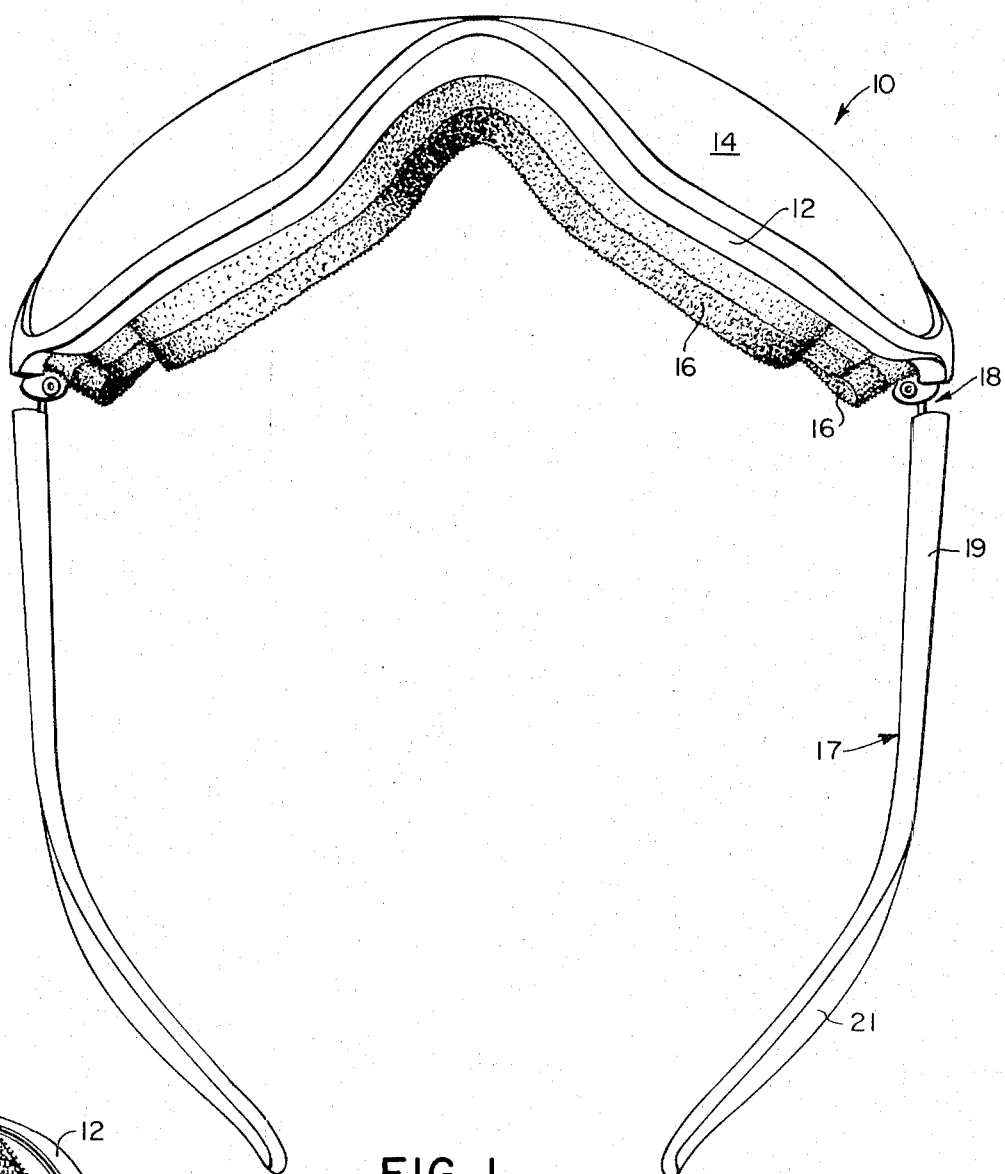
FIG. 1 is a bottom view of the eye protection frame assembly, embodying the invention, showing the temple members in their extended open position at the end of their pivotal movement.
Figure 2:
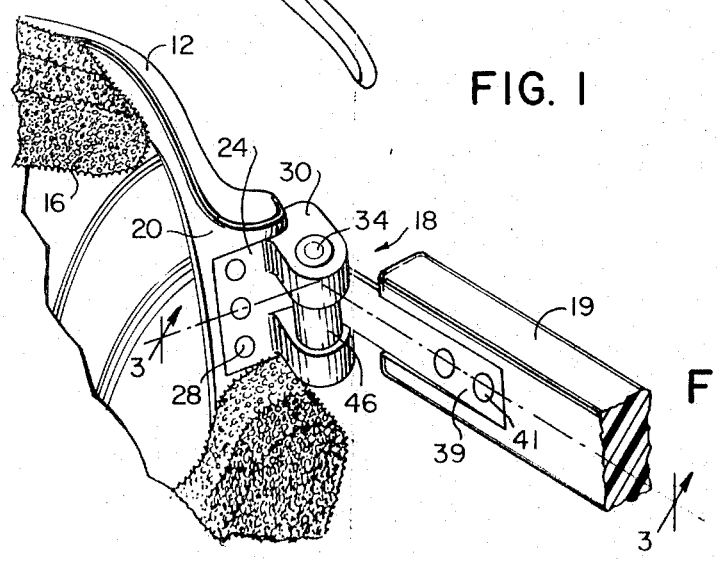
FIG. 2 is a fragmentary perspective view of the invention showing the structure connecting the temple members to the front lens retaining portion.

Referring to the drawing and particularly to FIGS. 1 and 2, the reference numeral 10 indicates the eye protection frame assembly generally, and 12 the front lens retaining portion into which lens 14 is inserted and positioned to protect the eyes and face of the wearer. Cushioning 16 may be provided especially around the nose supported area and the top edge forehead contacting area of the assembly.

A pair of temple members 17 extend rearwardly in the extended open position as shown in FIG. 1 and are attached to the front lens retaining portion 12 by means of connecting structure indicated generally by reference numeral 18 as shown in FIG. 2. The temple members 17 include a substantially straight front portion 19 which extends rearwardly for a distance normally just past the ear of the wearer and a rearward end 21 which is of a length approximately equal to the front portion and is bent at an angle to extend inwardly and downwardly toward each other.

Figure 4:
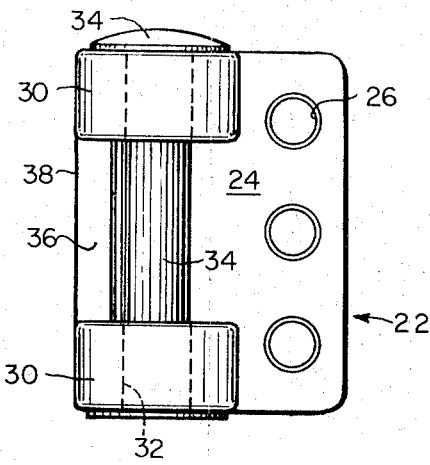
FIG. 4 is a plan view of a temple connecting member including the rivit pin supported thereby.
Figure 5:
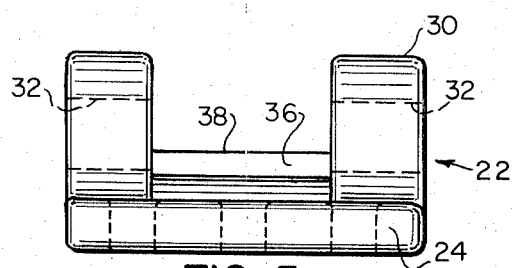
FIG. 5 is a side elevation view of the temple connecting member without the rivit pin.
Figure 3:
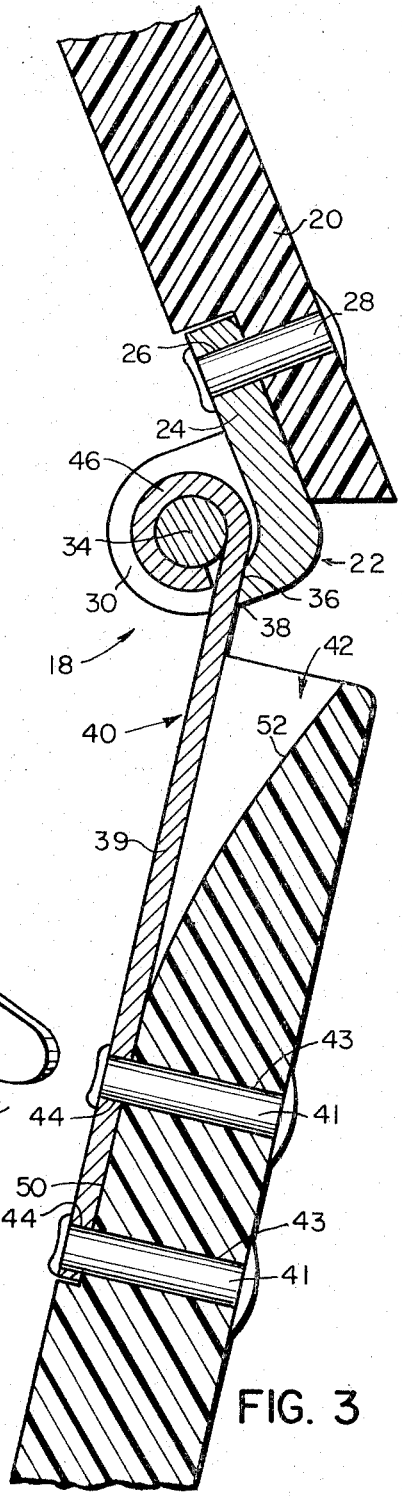
FIG. 3 is an enlarged sectional view taken on line 3—3 of FIG. 2 of the structure connecting the temple members to the front lens retaining portion.

FIGS. 3, 4 and 5 show the connecting structure 18, which is identical for each temple member, in more detail. Attached to each of the integral end portions 20 of the lens retaining portions 12 is a temple connecting member 22. The member 22 includes a plate-like body portion 24 which has three openings 26 therein for receiving three rivits 28 attaching the member 22 to the end portions 20 of the lens retaining portion. A pair of upstanding pin supporting members 30 extend upwardly from the body portion 24 each having an opening 32 therein for receiving a rivit type pin 34. Extending between the upstanding members 30 is an abutment means 36 which has a profile which slopes upwardly from the body portion 24 as shown in FIG. 3 and forms an edge 38 extending between the members 30.

Connected to each temple member is a spring metal strip 40. The strip is located in a groove 42 located in the front end portion of each temple member. A pair of rivits 41 extend through openings 43 in the rearward end of the straight portion 39 of strip 40 and openings 44 in the temple member to firmly attach the end of the strip in the groove. The spring metal strip 40 is of a considerable length with preferably more than half of the length thereof positioned within the temple groove 42. This length of the spring metal strip is important since the radius of curvature into which the spring strip is bent which can effect the life of the strip can be less with a long spring strip than a shorter spring strip for the same amount of spreading of the rear end portions of the temple members. The smaller radius of curvature into which the spring strip 40 is bent can also prevent a permanent set in the spring strip making it less effective as a biasing means.

The front end portion 46 of each spring metal strip 40 is bent into a circular shape which surrounds pin 34 for providing pivotal attachment of each of the temple members to the front lens retaining portion of the assembly. The bottom surface of temple groove 42, as shown in FIG. 3 is formed having a straight portion 50 of shallow depth in the area where each strip 40 attached and then a convex shaped portion 52 sloping down toward the end of the temple member. The convex portion increasingly supports the portion of the metal spring strip overlying the portion as the strip is urged into a substantially flexed condition.

Figure 6:
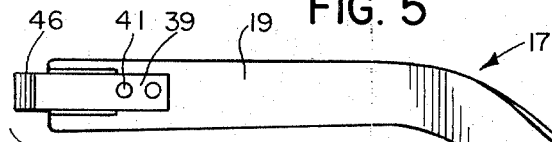
FIG. 6 is a side elevational view of a temple member with spring member attached.
Figure 7:
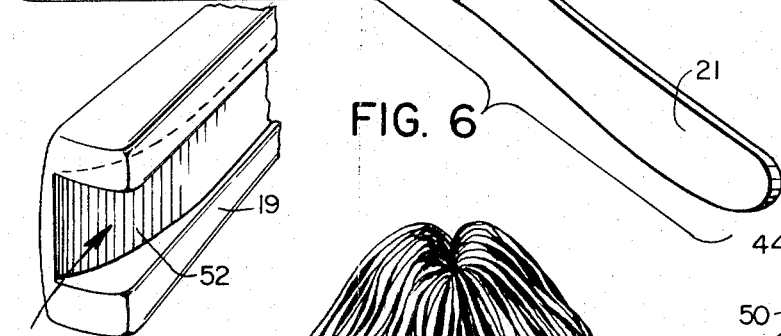
FIG. 7 is an end view of a temple member without the spring member.
Figure 8:
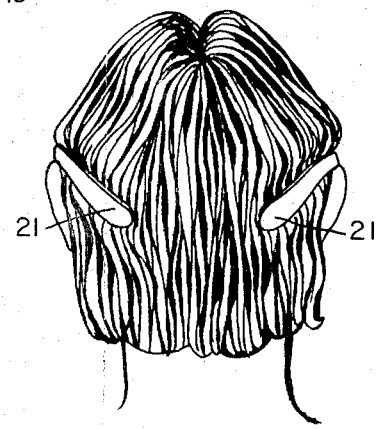
FIG. 8 is a back view of a wearers head showing the fit of the temple members thereon.

Referring to FIG. 1 it can be seen that even when the temple members are opened to the extent of their pivotal movement provided by the pivoting of the surrounding portion 46 of the metal strip about pin 34 the rearward ends of the temple members are only separated by a relatively small distance due to their length and bent configuration. The pivotal movement of the temple members is limited by contact of the strip with the abutment means 30 as shown in FIG. 3. To place the eye protection assembly on the head of the wearer it is necessary to spread the temple members apart causing flexing of the spring metal strip 40 especially the straight portion 39 thereof. The groove 42 is configured to allow the temples to separate to the necessary extent while the convex bottom portion of the groove increasingly supports the portion 39 of the metal strip 40. This increasing support of the spring strip as it is bent is of importance as it prevents breaking or permanent bends in the spring strip over a long period of use. The resistance of the metal strip 40 to flexing and its inherent property to return to its unflexed condition causes the temple members when thus separated to be urged or biased back to the extent of the pivotally open position as indicated in FIG. 1 and 3. This causes the temples to be urged against the wearers head providing the desired snug fit against both the side and rear of his head as shown in FIG. 6.

Thus, the objects of the invention are achieved by the assembly as shown and described which cooperate in a novel manner to achieve the desired result.

I claim:
1. An eye protection frame assembly comprising:
   a. a front lens retaining portion for retaining lens means in the line of vision of the wearer;
   b. a pair of integral end portions at the ends of said front lens retaining portion;
   c. a pair of temple members pivotally connected to said end portions and extending backward therefrom in a normal open position;
   d. a pair of temple connecting members, each having a platelike body portion attached at one end to said integral end portions of said front lens retaining portion and having a pair of upstanding pin supporting members extending outwardly from the opposite end of said body portion;
   e. a pin mounted between said pair of upstanding pin supporting members;
   f. an abutment means extending between said pair of pin supporting members;
   g. a pair of spring metal elongated strips, one end of each being attached to one of said temple portions and the other end surrounding one of said pins mounted on one of said temple connecting members for pivotally connecting the temples to said front lens retaining portion, said pivotal attachment of said spring metal strips to said pins allowing angular movement of said temple portions from their folded postions generally overlying the back of said front lens retaining portion through angles in which said temple portions extend backward from said front lens retaining portion, the pivotal movement of each of said spring metal strips being limited by contact with said abutment means extending between said pair of pin supporting members;
   h. whereby movement of said temple portions beyond the extent of their pivotal movement causes flexing of portions of said spring metal strips which initially allows said temples to separate further but then biases said temple portions back toward their normally pivoted open extended position providing a flexible but snug fit of said frame assembly on said wearer.

2. The eye protection assembly as described in claim 1 wherein each of said spring metal strips is attached to a temple member at a position spaced backwardly thereon, the portion of said temple member underlying said spring metal strip having a groove therein to receive said strip, the bottom surface of said groove having a convex curvature in a portion thereof sloping toward the front end of said temple member to increasingly support said spring metal strip as it is urged into a substantially flexed condition as the temple members are separated.

3. The eye protection assembly as described in claim 2 wherein the portion of each spring metal strip overlying said temple member and received in said groove has a length more than half of the entire spring metal strip so that it may bend over a considerable length of the strip while being supported in said groove.

4. The eye protection assembly as described in claim 1 wherein each of said pair of temple members includes a substantially straight front portion which extends rearwardly for a distance normally just past the ear of the wearer, the rearward end of such temple members being of a length at least approximately equal to the front portion and bent at an angle to extend inwardly and downwardly toward each other to generally conform to the shape of the head of the wearer and to snugly fit the back portion of his head.

* * * * *